UNITED STATES PATENT OFFICE.

FREDERICK DAVIS, OF LONDON, ENGLAND, ASSIGNOR TO JOHN ALFRED MARTIN, OF SAME PLACE.

PROCESS OF RENDERING TEA DIGESTIBLE.

SPECIFICATION forming part of Letters Patent No. 613,027, dated October 25, 1898.

Application filed January 20, 1898. Serial No. 667,311. (No specimens.)

*To all whom it may concern:*

Be it known that I, FREDERICK DAVIS, a citizen of England, residing at No. 51 Imperial Buildings, Ludgate Circus, in the city of London, England, have invented certain new and useful Improvements in Processes of Rendering Tea Digestible, (for which I have obtained Letters Patent of Great Britain, No. 27,460, dated November 23, 1897,) of which the following is a specification.

This invention relates to a preparation of tea, so as to render it more digestible.

With some persons the infusion of tea does not digest as readily as is desirable, and for this reason many persons who would otherwise use it daily refrain from taking it.

The infusion of tea is considered by the medical faculty to be harmful, especially to persons of weak digestion, by reason of the large percentage of tannic acid which it contains and also from the fact that very few people make the infusion in the manner in which it should be made.

Now the object of the present invention is to prepare tea in such a manner that the digestive properties of the infusion thereof are much improved, this result being attained by preventing almost entirely the prejudicial effect of the tannin or tannic acid. For this purpose tea, as it is ordinarily sold, is moistened with one or other of the three following solutions: First, four ounces of gum-acacia are covered with four ounces of cold water and kept in a warm place until the gum is dissolved; second, one ounce of commercial gelatin dried on the water-bath is dissolved in thirty-two ounces of boiling water and allowed to cool, and, third, one ounce of albumen dried on the water-bath is dissolved in twenty ounces of water warmed to a temperature not exceeding 175° Fahrenheit and allowed to cool.

One pound of tea moistened with four ounces of one of the above solutions is while still moist sprinkled with two ounces of a powder of the following composition: tartrated soda or double tartrate of sodium and potassium, two parts; neutral tartrate of potassium, one part; sulfate of sodium, one part; bicarbonate of potassium, two parts, and dried carbonate of sodium, sixteen parts.

The proportions may be somewhat varied; but those given above answer well.

After thorough mixture the prepared tea is dried at a low temperature, and when quite dry is mixed with ordinary tea in the proportion of one pound of the prepared tea to seven pounds of the ordinary tea.

By the preparation of the tea as above described it is rendered highly digestible. It does not retard gastric digestion. Its stimulating effect upon the brain is enhanced. Muscular activity is restored, and molecular change is arrested. Thus nerve force is improved, and the usual acid dyspepsia produced by ordinary tea is avoided, so that even the most delicate persons can take the prepared tea without fear of unpleasant consequences.

Having thus described the nature of this invention and the best means I know of carrying the same into practical effect, I claim—

The process of preparing tea to render it more digestible, consisting in moistening a portion of the tea with a solution of gum-acacia, gelatin or albumen, sprinkling it with a mixture of double tartrate of sodium and potassium, neutral tartrate of potassium, sulfate of sodium, bicarbonate of sodium, and dried carbonate of sodium, drying the portion thus treated and mixing it with the remainder; substantially as described.

In testimony whereof I have hereunto set my hand in presence of two subscribing witnesses.

F. DAVIS.

Witnesses:
JOS. GRIFFITHES,
SAMUEL LAWTHER.